United States Patent [19]
Alling et al.

[11] 3,713,713
[45] Jan. 30, 1973

[54] LANCED TAB RACE

[75] Inventors: Richard L. Alling, RFD 1; Roger L. Iffland, both of Torrington, Conn.

[73] Assignee: The Torrington Company, Torrington, Conn.

[22] Filed: Dec. 30, 1971

[21] Appl. No.: 214,260

[52] U.S. Cl. ............................ 308/235, 29/148.4 A
[51] Int. Cl. ............................................. F16c 33/64
[58] Field of Search ........... 308/212, 235; 29/148.4 A

[56] References Cited
UNITED STATES PATENTS 3,253,869   5/1966   Smith ................................. 308/212

Primary Examiner—Milton Kaufman
Assistant Examiner—Frank Susko
Attorney—Frank S. Troidl et al.

[57] ABSTRACT

A thrust bearing race is disclosed which employs lanced tabs to retain the cage assembly. The structure of the tabs facilitate assembly and provide improved retention of the assembly. Cut-outs in the flange are also provided to improve lubrication and provide clearance at assembly.

19 Claims, 8 Drawing Figures

PATENTED JAN 30 1973 3,713,713

LANCED TAB RACE

This invention relates to a thrust bearing. More particularly, this invention is a new and improved thrust bearing race wherein lanced tabs insure smoother assembly and improved retention of the cages.

The conventional thrust bearing has a cage and roller assembly positioned between two annular flat raceways. Typically, the assembly is held together by a peripheral band as shown in U.S. Pat. No. 2,891,828 issued to Winchell. The cap or banded configuration, besides requiring an extra part and forming operation, interferes with flow of lubricant to and from the rollers, races and the piloting surfaces. Alternatively, the raceways may be complementary L-shapes when viewed in cross section with projections from the edges of the flange of each raceway restraining axial movement of the cage from the race. The complementary L-shaped raceways, having flanges and projections thereon, require more force to assemble than to disassemble the bearing and frequently cause separation of the laminated-type cage during snap-in installation.

Our invention provides axial retaining means for the roller-cage assembly within the formed flange of the thrust race that is more secure than the conventional projections, yet easier to assemble. It eliminates the requirement for a special component (outer banding cup) by combining the functions of axial retention and radial bearing guidance into the thrust race formed flange. Furthermore, it improves lubricant circulation through the bearing assembly by elimination of the banding cup and by the addition of slots in the thrust race formed flange. The spot staked flange edges or bent sections on flange edges known to prior art made it difficult to assemble the roller and cage assembly since the sharp angled portion is directed outwardly and resists installation while the gentle sloped portion detracts from its retentive ability. Conversely, the lanced tab has its sharp projection inward which permits easy installation and contributes improved retention. This is analogous to having the barb of a fish hook hold the fish on the point rather than resisting his effort to get caught.

The invention as well as its many advantages may be further understood by reference to the following detailed description and drawings in which.

Figure 1:
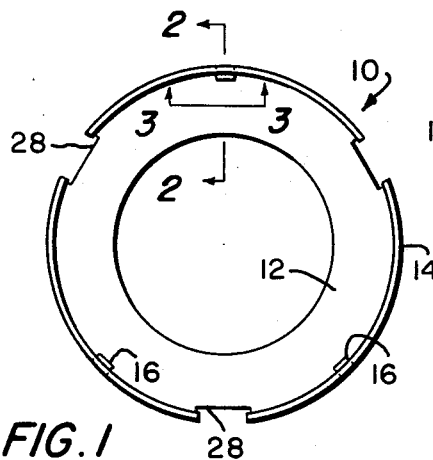
FIG. 1 is an elevational view of a thrust bearing race.
Figure 2:
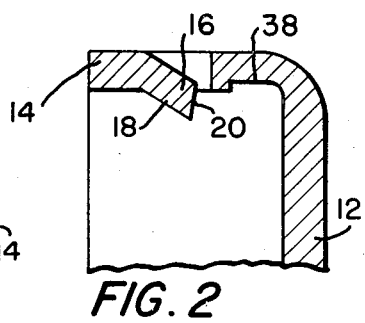
FIG. 2 is a partial section of a lanced tab taken along section 2—2.

Like parts throughout the various views are referred to by like numbers. Referring to the drawings and particularly to FIG. 1, the thrust bearing race, indicated generally by 10, comprises a raceway 12 with an integral flange 14. The flange is lanced at at least one but preferably at a plurality of locations to form an inwardly directed tab configuration 16. The enlarged section of FIG. 2 clearly shows that the tab has a ramp face 18 along which a cage to be inserted may readily slide, and a retaining edge 20 which effectively restrains the cage from withdrawal or axial separation.

Figure 3:
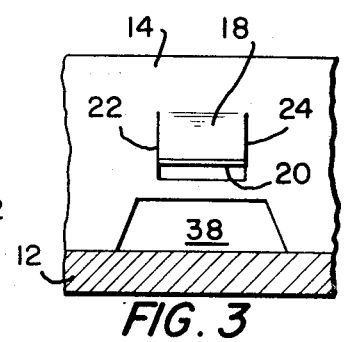
FIG. 3 is a partial section of a thrust bearing race showing the lanced tab.
Figure 4:
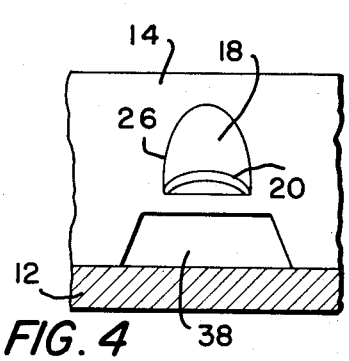
FIG. 4 is an alternate embodiment of the lanced tab illustrated in FIG. 3.

Normally, the flange 14 is lanced with three cuts 20, 22, and 24 to form a square-shaped tab as illustrated in FIG. 3. However, it has been found that when the flange 14 is short, this configuration is conducive to cracks which propagate to the edge of the flange and may result in tabs breaking off. In such circumstances, an alternative tab configuration has been found satisfactory wherein the single lance 20 is made and an arcuate tab 26 is formed as illustrated in FIG. 4.

The flange may be continuous around the periphery of the race or it may be provided with cut-outs 28 as shown in FIG. 1 to facilitate machine assembly of the other elements of the thrust bearing to provide lubrication ports or to accommodate assembly past obstructions. Three tabs are usually provided and may be spaced 120° apart or asymmetrically for easier installation of the cage as described below.

Figure 5:
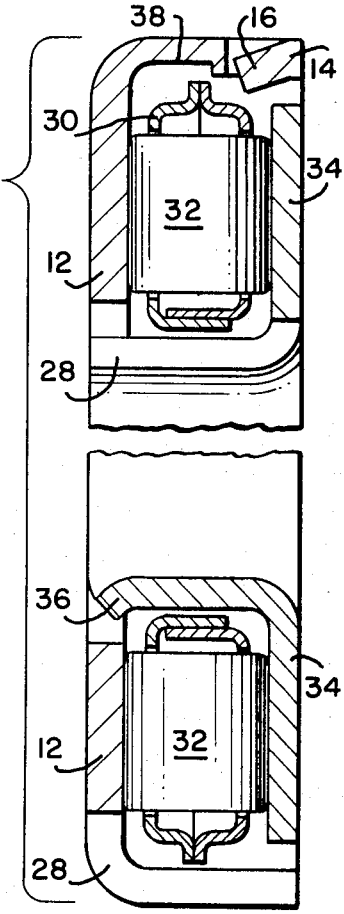
FIG. 5 is a section of the thrust bearing assembly comprising a cage and rollers mounted in a thrust race with the lanced tab of FIG. 3 and a second opposed race.

This thrust bearing may comprise the lanced race 10, a cage 30, and rolling members 32 with or without an opposed race 34 as illustrated in FIG. 5. Flange edges of races can extend beyond opposing races or be flush with opposing race abutting surface. When the opposed race is included, it may be provided with conventional retaining projections 36 by which it is snapped onto the inner edge of the cage to retain it with the bearing assembly. However, lanced tabs of both configurations as illustrated in FIGS. 3 and 4 can be used on this opposed race.

Figure 7:
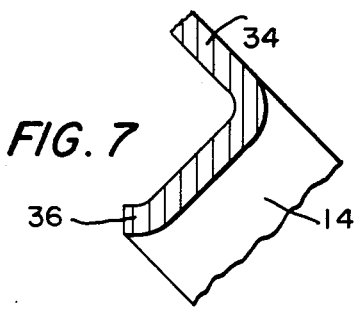
FIG. 7 is a partial section of the opposed race taken along 7—7.
Figure 8:
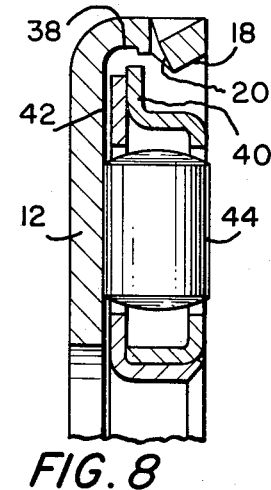
FIG. 8 is a partial section of an asymmetrical cage and a single race with the lanced tab of FIG. 4.
Figure 6:
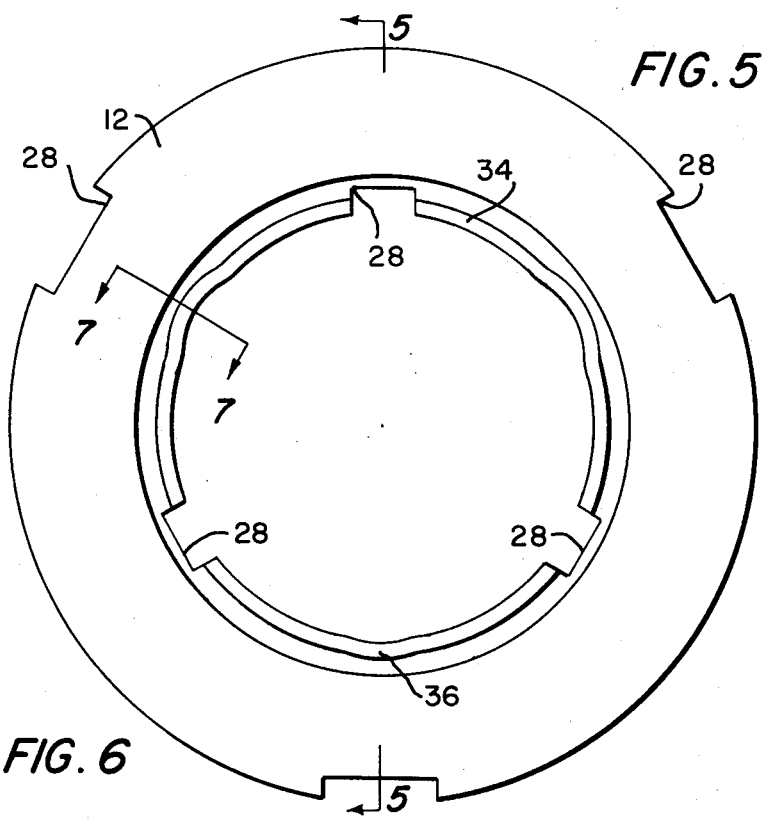
FIG. 6 is an elevational view of the second opposed race flange end and back side surface of the race of FIG. 1.

FIG. 6 shows the cut outs in the race flanges, and FIG. 7 shows a conventional retaining projection on an inner race in partial section. FIG. 8 illustrates an embodiment in which the outer flange 40 of the cage has been offset toward the single race face 42. This permits a design in which the single race flange does not extend beyond the exposed face 44 of the thrust assembly roller.

To assemble, the cage and rolling element assembly is inserted under the retaining edge 20 of two lanced tabs and the free edge of the cage is then pressed along edge 18 of the remaining tab until the assembly snaps into place under the retaining edge 20 of the third tab. The cage is then securely in place and free to rotate. The second opposed race is then inserted by snapping it over the inner edge of the cage.

It has also been found that during forming of the lanced tab race it is preferable to coin the area 38 between the tab and the raceway to thin the flange. If the coining operation is omitted, the flange fillet radius tends to bind the cage edge and interfere with its rotation.

We claim

1. A thrust bearing race comprising a radially extending annular raceway having inner and outer diameters;
   a flange integral with and projecting axially from the outer diameter of the raceway; and at least one lanced tab projecting from the free edge of the flange inwardly and axially toward the raceway.

2. The thrust bearing race of claim 1 further comprising at least one peripheral aperture in the flange.

3. The thrust bearing race of claim 2 wherein three lanced tabs are unequally spaced around the flange.

4. The thrust bearing race of claim 3 further comprising a coined area in the flange between each tab and the raceway.

5. The thrust bearing race of claim 4 wherein the lance comprises a single cut.

6. The thrust bearing race of claim 4 wherein the lance comprises a plurality of straight cuts.

7. A thrust bearing assembly having a cage, rolling elements, and a first race comprising a radially extending annular raceway having inner and outer diameters, a flange integral with and projecting axially from the outer diameter of the raceway, and at least one lanced tab projecting from from the free edge of the flange inwardly and axially toward the raceway whereby the cage and rolling elements are snapped into position between the raceway and tabs, and axial movement of the cage and rolling elements is restrained.

8. The thrust bearing assembly of claim 7, wherein the free edge of the flange is intermediate the plane described by exposed faces of the rolling elements and said annular raceway.

9. The thrust bearing assembly of claim 7 wherein the free edge of the flange extends beyond the plane described by the exposed faces of the rolling elements.

10. The thrust bearing assembly of claim 7, further comprising a second opposed race having a radially extending annular raceway with inner and outer diameters, a flange integral with and extending axially from the inner diameter of the raceway of the second opposed race.

11. The thrust bearing assembly of claim 10, further comprising at least one projection extending radially from the free edge of the flange of the second opposed race, whereby it is snapped into place.

12. The thrust bearing assembly of claim 11, further comprising at least one cut-out portion of the flange of at least one of the races.

13. The thrust bearing assembly of claim 12 wherein said projection is a lanced tab projecting from the free edge of the flange radially and axially toward the raceway.

14. The thrust bearing assembly of claim 12, wherein said projection is a radially offset portion of the free edge of the flange.

15. The thrust bearing assembly of claim 13 wherein the flange of each raceway extends axially at most to the plane described by the distant face of the opposing race.

16. The method of making a thrust bearing race comprising the steps of:
stamping an annular blank having a body with an inner and outer diameter;
coining at least one area near the outer diameter;
lancing the blank between at least one coined area and the outer diameter to create a tab having its separated end radially inward of its integral end; and
forming an axial flange along the outer diameter that includes the coined areas and lanced tabs whereby the tabs are inwardly axially directed from the flange toward the annular body.

17. The method of making a thrust bearing race comprising the steps of:
blanking an annular body with an inner and outer diameter and at least one coined area near the outer diameter;
forming an axial flange at the outer diameter; and
lancing the flange between at least one coined area and the free edge of the flange to create a tab having its separated end radially inward of its integral end and inwardly axially directed toward the annular body.

18. The method of making a thrust bearing race comprising the steps of:
stamping an annular blank having a body with an inner and outer diameter;
coining at least one area near the inner diameter;
lancing the blank between at least one coined area and the inner diameter to create a tab having its separated end radially outward of its integral end; and
forming an axial flange along the inner diameter that includes the coined areas and lanced tabs whereby the tabs are outwardly axially directed from the flange toward the annular body.

19. The method of making a thrust bearing race comprising the steps of:
blanking an annular body with an inner and outer diameter and at least one coined area near the inner diameter;
forming an axial flange at the inner diameter; and
lancing the flange between at least one coined area and the free edge of the flange to create a tab having its separated end radially outward of its integral end and outwardly axially directed toward the annular body.

* * * * *